(12) United States Patent
Katoh

(10) Patent No.: US 8,463,544 B2
(45) Date of Patent: Jun. 11, 2013

(54) NAVIGATION APPARATUS FOR SEARCHING DESTINATION BASED ON STREET NAME

(75) Inventor: Noriko Katoh, Toyoake (JP)

(73) Assignee: DENSO CORPORATION, Kariya (JP)

( * ) Notice: Subject to any disclaimer, the term of this patent is extended or adjusted under 35 U.S.C. 154(b) by 960 days.

(21) Appl. No.: 11/984,242

(22) Filed: Nov. 15, 2007

(65) Prior Publication Data

US 2008/0133123 A1 Jun. 5, 2008

(30) Foreign Application Priority Data

Dec. 5, 2006 (JP) .................................. 2006-328192

(51) Int. Cl.
*G01C 21/36* (2006.01)

(52) U.S. Cl.
USPC ........................................................ 701/454

(58) Field of Classification Search
USPC ........................................................ 701/200
See application file for complete search history.

(56) References Cited

U.S. PATENT DOCUMENTS

| | | | |
|---|---|---|---|
| 5,825,306 A | 10/1998 | Hiyokawa et al. | |
| 6,088,649 A * | 7/2000 | Kadaba et al. ................ | 701/538 |
| 6,108,631 A * | 8/2000 | Ruhl ............................ | 704/270 |
| 6,112,153 A * | 8/2000 | Schaaf et al. ................. | 701/532 |
| 6,115,669 A | 9/2000 | Watanabe et al. | |
| 7,376,636 B1 * | 5/2008 | Wang et al. ................... | 707/694 |
| 7,388,519 B1 * | 6/2008 | Kreft ....................... | 340/995.24 |
| 2004/0260464 A1 * | 12/2004 | Wong ........................... | 701/209 |
| 2005/0182561 A1 | 8/2005 | Yamada et al. | |
| 2006/0253251 A1 * | 11/2006 | Puranik et al. ................ | 701/211 |
| 2007/0233375 A1 * | 10/2007 | Garg et al. ................... | 701/211 |
| 2008/0077319 A1 * | 3/2008 | Kato et al. ................... | 701/208 |
| 2008/0140307 A1 * | 6/2008 | Chen et al. ................... | 701/200 |
| 2008/0312814 A1 * | 12/2008 | Broadbent et al. ............ | 701/200 |

FOREIGN PATENT DOCUMENTS

| | | |
|---|---|---|
| EP | 0 633 452 B1 | 1/2000 |
| JP | A-6-251295 | 9/1994 |

* cited by examiner

*Primary Examiner* — Shelley Chen
(74) *Attorney, Agent, or Firm* — Posz Law Group, PLC

(57) ABSTRACT

A navigation apparatus allows an input of either a formal street name text string or only a body street name text string as an input of a street name from a touch panel when a destination address search is performed by using a house number, a street name and a city name. Then, a control unit searches for streets that have the same text string in the formal street name as an inputted text string, and displays a list of streets by the body street name on a display unit. When one of the streets in the list is selected, a destination search for searching for a place that includes as an address the selected street, the text string inputted as the street name, and the city name inputted before or after street name selection is performed.

22 Claims, 6 Drawing Sheets

FIG. 2

| STREET NAME | REPRESENTATION |
|---|---|
| ⋮ | ⋮ |
| E CAR St | CAR |
| ⋮ | ⋮ |
| E CARSON Av | CARSON |
| E CARSON St | CARSON |
| ⋮ | ⋮ |
| W CAR St | CAR |
| ⋮ | ⋮ |
| W CARSON St | CARSON |
| ⋮ | ⋮ |

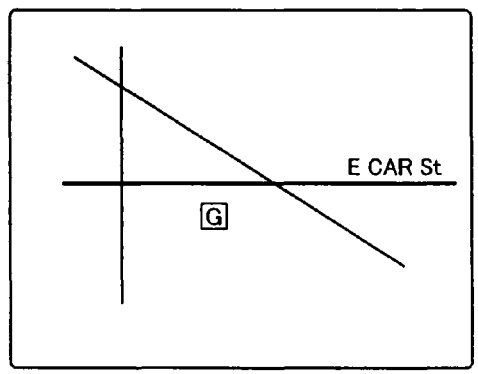

NAVIGATION APPARATUS FOR SEARCHING DESTINATION BASED ON STREET NAME

CROSS REFERENCE TO RELATED APPLICATION

This application is based on and claims the benefit of priority of Japanese Patent Application No. 2006-328192 filed on Dec. 5, 2006, the disclosure of which is incorporated herein by reference.

FIELD OF THE DISCLOSURE

The present disclosure generally relates to a navigation apparatus for use in a vehicle.

BACKGROUND INFORMATION

Conventionally, a vehicular navigation apparatus detect a current vehicle position by using Global Positioning System (GPS) or the like, and navigates a vehicle to an intended destination by displaying a map that covers an area including the current vehicle position with a marking of the vehicle.

Further, the navigation apparatus searches a navigation route from the current position to the destination, and displays the searched route on the map by using a color different from a road color for providing a voice guidance along the route at, for example, an intersection or the like.

The navigation apparatus uses various methods for setting the destination. The methods include setting the destination based on a telephone number, an address, a name and the like. In Europe and United States, the address includes a street name, thereby necessitating an input of the street name for destination search by the address (refer to, for example, Japanese patent document JP-A-H06-251295 and JP-A-H09-212086). For representing the destination search by address, the name "address search" is used in the following.

Further, the navigation apparatus in Europe and the United States has a search method that uses two street names as inputs for identifying an intersection of the two streets. The search method with two street names is designated as an "intersection search" in the following.

The street name consists of plural parts, that is, a body part for representing a proper name of the street, a prefix/suffix part for representing a direction, an area of the street, and a street type part for representing a type of the street such as "Avenue", "Road" or the like. The description in the following designates the representation of the street name by using the body, prefix/suffix, and street type as a formal street name, and designates the representation of the street name by using only the body as a body street name.

In conventional navigation apparatuses, a user is required for specifying, in the address search and the intersection search, the formal street name or the body street name depending on the kinds of the apparatuses. However, the street is generally recognized by its body name. In Europe and the United States, the address is often represented by only the body street name with the other parts being omitted (For example, street names on the sign boards on a roadside, invitation letters and the like).

When the navigation apparatus demands the formal street name as a requirement, only specifying the body street name does not work. Therefore, in Europe and the United States, the apparatus that allows the destination search only by specifying the body street name is preferred. For example, when the body street name is specified in the apparatus that demands the formal street name, the formal street names having the specified body name are listed. Then, the user chooses an intended street from among the listed ones. In this case, the user cannot perform the street search any longer when he/she does not know the formal street name.

On the contrary, when the navigation apparatus demands the body street name as a requirement, specifying the body name with other part does not lead to the street search, thereby enabling no street name list display. For example, when the street name printed on a name card is input, the formal street name on the name card will not work for the street search.

SUMMARY OF THE DISCLOSURE

In view of the above and other problems, the present disclosure provides a navigation apparatus for use in a vehicle that is enabled to search for an address or an intersection upon having either of a formal street name input or a body street name input by allowing a user to select a full street name based on a body street name.

The navigation apparatus of the present disclosure uses an input of either of the formal street name character string or the body street name character string as a street name from an input unit for the purpose of searching for an address of a location. Then, street name candidates that have the inputted character string in the formal street name are searched and listed for a selection by the user. Then, a specific street is chosen from the listed street names in combination with the inputted street name character string and a house number inputted before and/or after the street name selection for performing a destination address search.

The navigation apparatus determines two street names respectively in the same manner as the method described above for searching for an intersection as a crossing point of the two streets.

Thus, either of the two types of street name input methods, that is, the formal street name input and the body street name input, is used for the address search and the intersection search for an improved convenience of the user of the navigation apparatus.

BRIEF DESCRIPTION OF THE DRAWINGS

Other objects, features and advantages of the present invention will become more apparent from the following detailed description made with reference to the accompanying drawings, in which:

FIG. 2 shows an illustration of a relationship between formal street names and display names;

FIGS. 5A to 5F show illustrations of a display content on a display unit for the street name input;

FIGS. 6A to 6C show illustrations of a display content on the display unit for searching for a destination; and FIGS. 7A and 7B show illustrations of a display content of the display unit used for an intersection search in a second embodiment of the present disclosure.

DETAILED DESCRIPTION

Embodiments of the present disclosure are described with reference to the accompanying drawings.

First Embodiment

Figure 1:
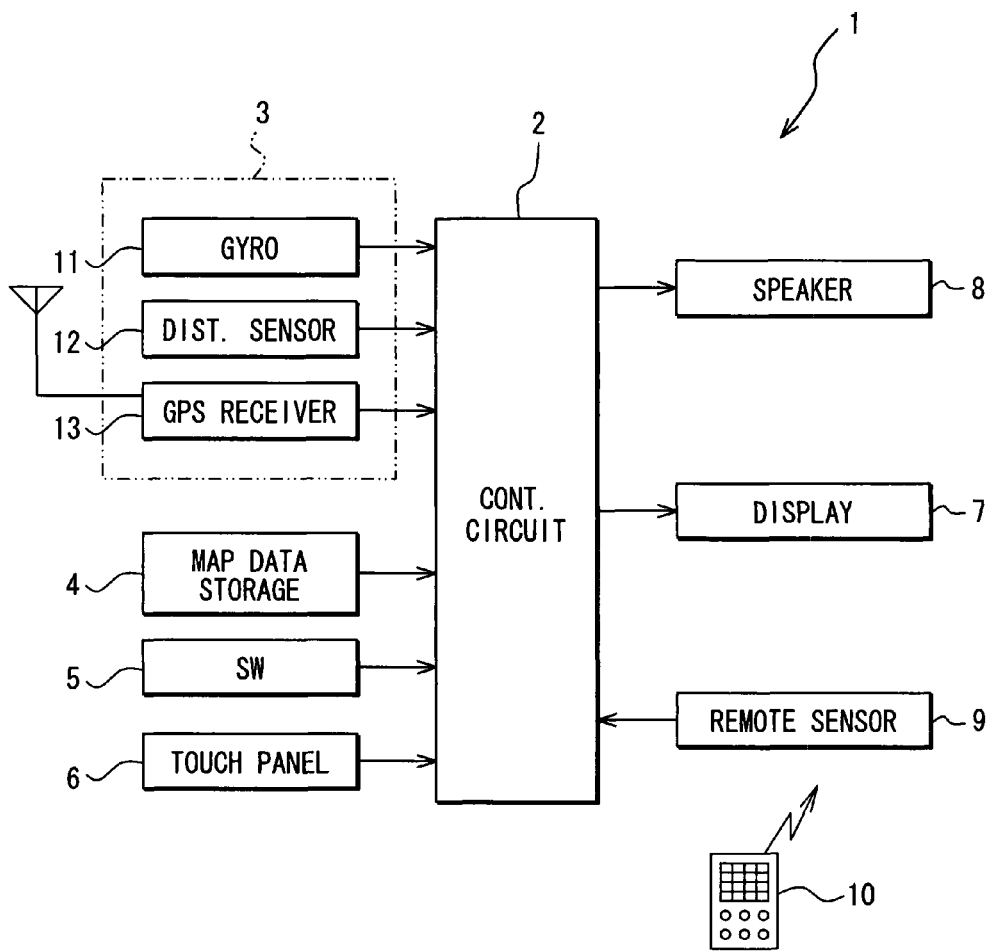
FIG. 1 shows a block diagram of a navigation apparatus for use in a vehicle in a first embodiment of the present disclosure.

The first embodiment of the present disclosure is explained based on FIG. 1-FIG. 6C as follows. FIG. 1 is a block diagram showing an electric constitution of a car navigation apparatus 1. The car navigation apparatus 1 possesses a control circuit 2 for controlling the navigation apparatus, a position sensing device 3 as a device for a position sensing function, a map data storage device 4 as a device for map data storage, an the operation switch group 5, a touch panel 6, a display unit 7 as a device for display information and the like, a sound generator 8, a wireless remote controller sensor 9 and a remote controller 10 paired to the sensor 9.

The control circuit 2 has a function to control the whole operation of the car navigation apparatus 1, and it is mainly constituted by a microcomputer as a main portion. In other words, the control circuit 2 possesses a CPU, a ROM, a RAM, an input/output (no illustration provided) and buses to connect those parts. Among those parts, an execution program to operate the car navigation apparatus 1 is stored in the ROM, and temporary data and/or map data which is acquired from the map data storage device 4 are stored in the RAM temporarily at a time of program execution.

The position sensing device 3 consists of a gyroscope 11, a range sensor 12 and a GPS receiver 13. Because they respectively have the different detection error of their property, these sensors 11-13 can perform accurate position sensing while revising the detection error with each other by mutual compensation. Further, it is not necessary to possess all of the sensors 11-13 depending on a required detection accuracy level, with some of those sensors 11-13 selectively employed. Furthermore, wheel sensors for detecting the turn of each tire as well as a steering rotation sensor for detecting steering rotation and the like may also employed for constituting the position sensing device 3.

The map data storage device 4 consists of, for example, an information recording medium such as DVD-ROM or the like, and a reading device reading data from an information recording medium such as DVD-ROM, and the reading device reads the information from the recording medium and inputs the information into the control circuit 2. In this case, data stored in the storage device 4 includes, map data, data for map matching, data to guide a course by a sound, position search data to search a position in the map from the addresses mentioned later as well as categorized data according to search genres to enable a destination genre search for searching for a destination by genre and a street search data that lists formal street names.

The display unit 7 has a liquid crystal display as a display screen of map data, text and/or marks, and a transparent touch panel 6 described above is attached on the surface of the liquid crystal display.

The operation switch group 5, the touch panel 6, the remote controller 10 are used as a device to input data, setting matter and various inputs for destination setting. For example, the operation switch group 5 consists of press-button switches which are disposed around a liquid crystal display.

The control circuit 2 has a display control function. That is, the control circuit 2 operates a current vehicle position based on information input from the position sensing device 3 and displays a road map around the current position on the liquid crystal display of the display unit 7 based on the map data. Further, the control unit 2 displays a pointer that indicates the current vehicle position and a progress direction in the displayed road map. The scale of the road map displayed on the screen can be changed by an operation of the operation switch group 5.

The control circuit 2 has a function to set the course to the destination and a guidance function for directing by a sound or the like the course from the sound generator 8. In other words, when the operation switch group 5, the touch panel 6 or the remote controller 10 are used to set the destination or the stop-by place, the most suitable course from the current position to the destination is automatically set as a guidance course and the most suitable course is displayed as the guidance course with a different color that is different from the normal road color on the road map that is shown on the liquid crystal display of the display unit 7. Then, the control circuit 2 guides the driver along the guidance course by providing the progress direction of the vehicle by sounds. In this case, as a method to set the most suitable course, Dijkstra method or the like is used.

The map data which the map data storage device 4 memorizes possess link information, node information and the like for displaying a map on the liquid crystal display of the display unit 7. That is, the map is represented by using links and nodes in an assumption that a road in the map can be divided into plural number of portions (i.e., links) by the nodes that correspond to intersections, branch points, merging points and curves having a curve angle of a predetermined degree or more by definition, and the links are combined with each other to construct a topology of the road map.

The link information described above has, for each of the links, a unique link ID, a link length, the coordinates of a starting edge and an ending edge, a road width of the link, the road classification (a national highway, a municipal road, an expressway) and the like as link attributes. The node information described above has, for each of the nodes, a unique node ID, the coordinates of the node, a node attribute such as, for example, data indicative of a grade separation or multiple traffic lanes and the like.

In addition, the above position search data which the map data storage device 4 has consists of map search data that associates the coordinates on the map with an address, a building name, a facility name, an intersection name, a telephone number and the like for enabling a position search when a departure place and/or a destination are specified by the address, the building name, the facility name, the intersection name, the phone number or the like.

The street search data which the map data storage device 4 has is the a list of formal street names in character strings in the alphabetical order with display character data attached thereto.

The display character data consists of a character string of each street name to be displayed on the display unit 7.

As for the official street name character string, it is constructed from a body name character string that is a proper noun of the street and a prefix/suffix character string attached in front/rear of the body name as well as the character string of the street type. In this case, the character string before or after the body name character string is generally called as an attached character string, and the body name character string and the attached character string are separated by a space interposed therebetween as the attached character strings mutually are. In this case, the space is considered as a part of the formal name character string.

An example of the street search data is shown in FIG. 2. In FIG. 2, on the left side of the illustration, the street search data memorizes the formal street names in the alphabetical order, and on the right side in one to one correspondence, the display character data to display each street by the body name on the display unit 7 is arranged. In the example of FIG. 2, there are five street names that include "CAR" as a part of the formal name string, that is, "E CAR St", "W CAR St", "W CARSON St", "E CARSON St", and "E CARSON AV." The display character string data is displayed, for example, in the present embodiment by using "CAR" as a key body name string for two street names of "E CAR St", and "W CAR St", and by using "CARSON" as a key body name string for three street names of "W CARSON St", "E CARSON St", and "E CARSON AV."

As for the display character data, it is not limited only to use the body name character string in this case. That is, for example, the body name string "CAR" may be accompanied by the prefix and the suffix in parenthesis such as "(E, W) CAR (St)" or the body name "CARSON" may be accompanied by the prefix and suffix "(E, W) CARSON (AV, St)" in the list.

The operation of the navigation apparatus 1 having the above constitution is described next. At first when any of the operation switch group 5, the touch panel 6, or the remote controller 10 is operated for utilizing the guidance function of the car navigation apparatus 1 to go to the destination, the control circuit 2, after being turned to a destination setting mode, displays plural search methods such as an address search, an intersection search, a name search, a search according to the genre on the display unit 7 and asks a user which search method is used for searching for the destination.

Figure 3:
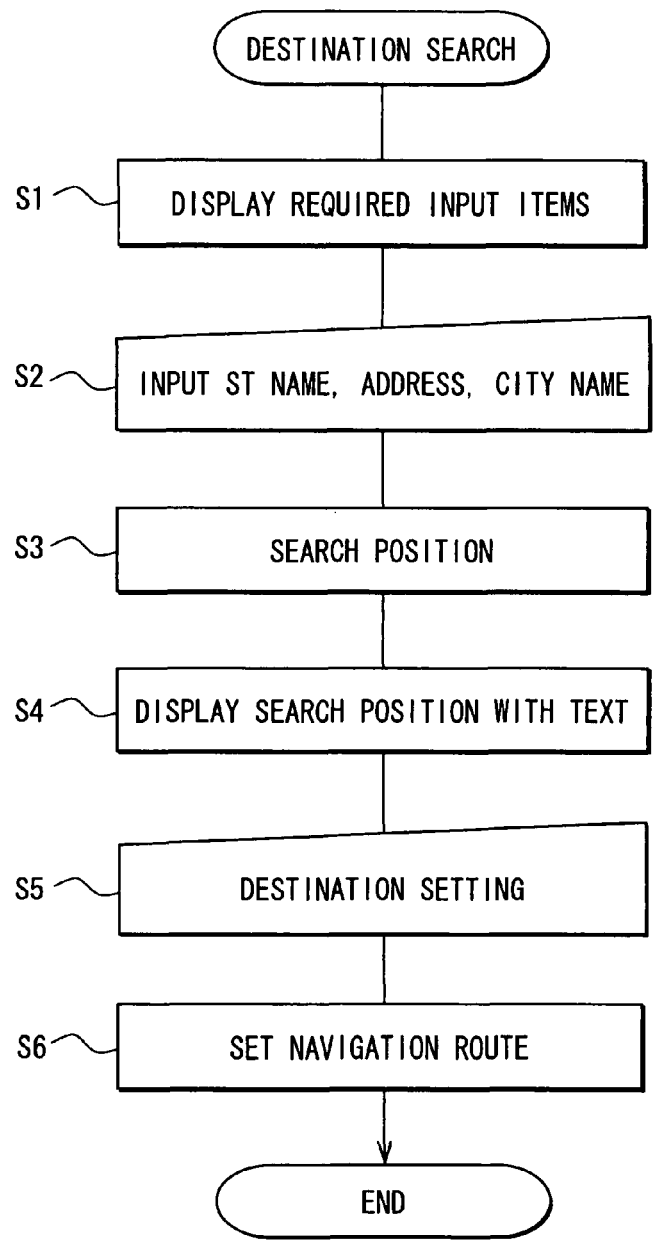
FIG. 3 shows a flowchart of a destination setting process by searching for an address.
Figures 5A, 5B, 5C, 5D, 5E, 5F:
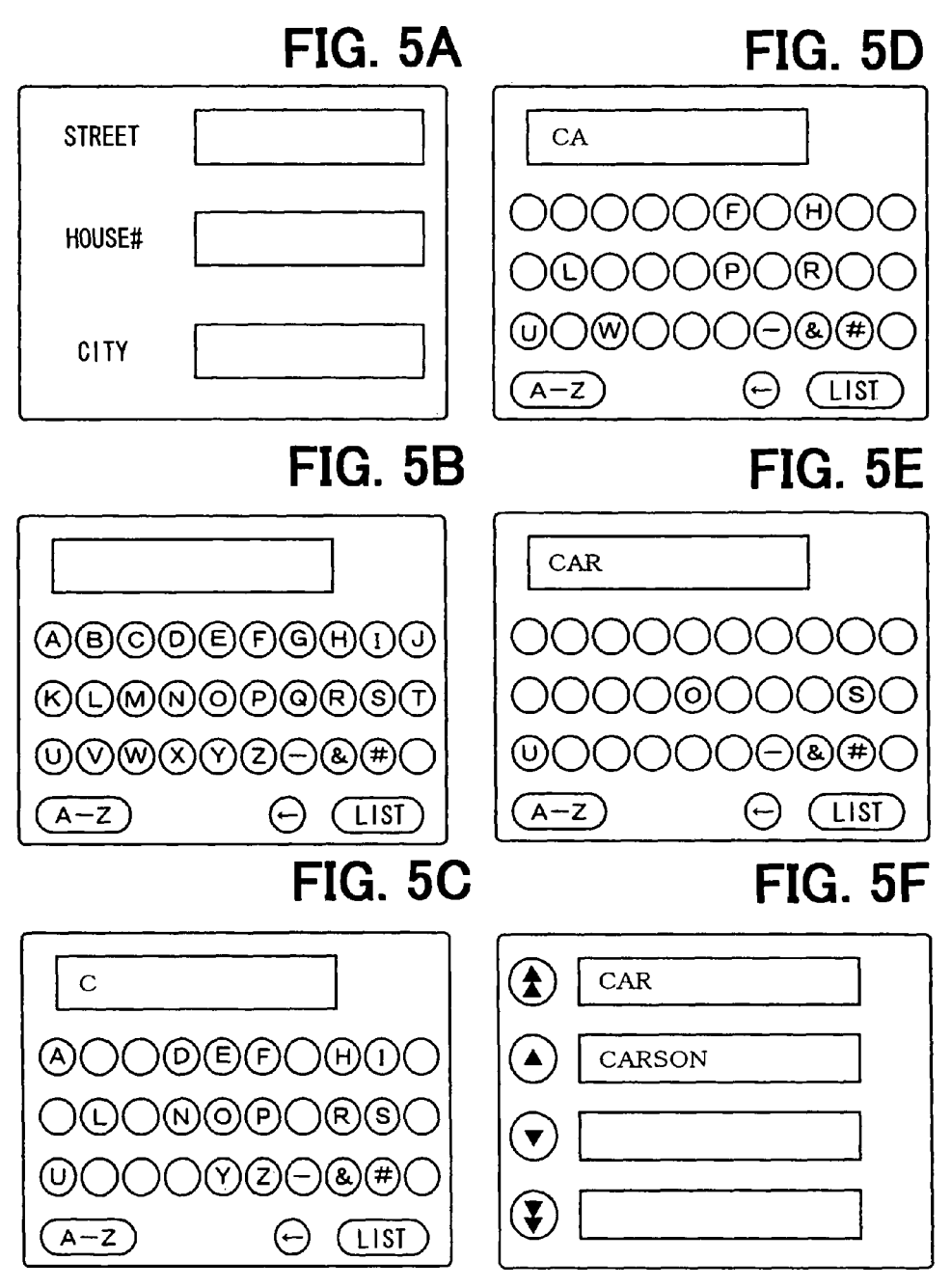

If a user chooses the address search, the control circuit 2 starts the execution of a routine for the address search as shown in FIG. 3, and at first displays the input item required for the address search as shown in FIG. 5A on the display unit 7 (step S1 of FIG. 3). For the address search, a city name ("City" in FIG. 5A), a street name ("Street" in FIG. 5A), and a house number ("House#" in FIG. 5A) are required. If a user chooses to input the street name from among these three items, the control circuit 2 displays the alphabets on the display unit 7 as shown in FIG. 5B by entering a street name input routine (step A1 of FIG. 4).

The character string of the street name is sequentially input by a user by the alphabet input screen. For example, at first a "C" key of the touch panel 6 is pressed for inputting a character string of the street name when inputting a house number of "516" of a "CAR" street in an "ABC" city as a destination. Then the control circuit 2 displays a character "C" in an upper part of the screen of the display unit 7 as shown in FIG. 5C.

Then, the control circuit 2 refers to a city name list memorized by the ROM, for example, to find city names starting with the character "C", and picks up the second character in the city names starting with "C." Then, the alphabet keys for the second character in the city names starting with "C" are highlighted with the other alphabets dimmed on the screen.

Next, when the user chooses "A" among the highlighted characters, the control circuit 2 displays the character "A" besides the already-displayed character "C" as shown in FIG. 5D in the upper part of the display unit 7. Then, referring to the list of city names and searching for the city names having "CA" as the first two characters in the name, the third characters in the city names are alphabetically identified. Then, the keys of the third character are highlighted on the screen with the other keys dimmed.

Finally, when the user chooses "R" from the highlighted alphabet keys, the control circuit 2 lines up "R" with the existing "CA" as shown in FIG. 5E in the upper part of the screen of the display unit 7. In addition, for example, all cities which have the string "CAR" as the first three characters are searched by referring to a list of the city names memorized by the ROM, and the fourth character alphabet in the city names are identified. Then, the identified fourth alphabet keys are highlighted with the other alphabets dimmed on the screen.

Figure 4:
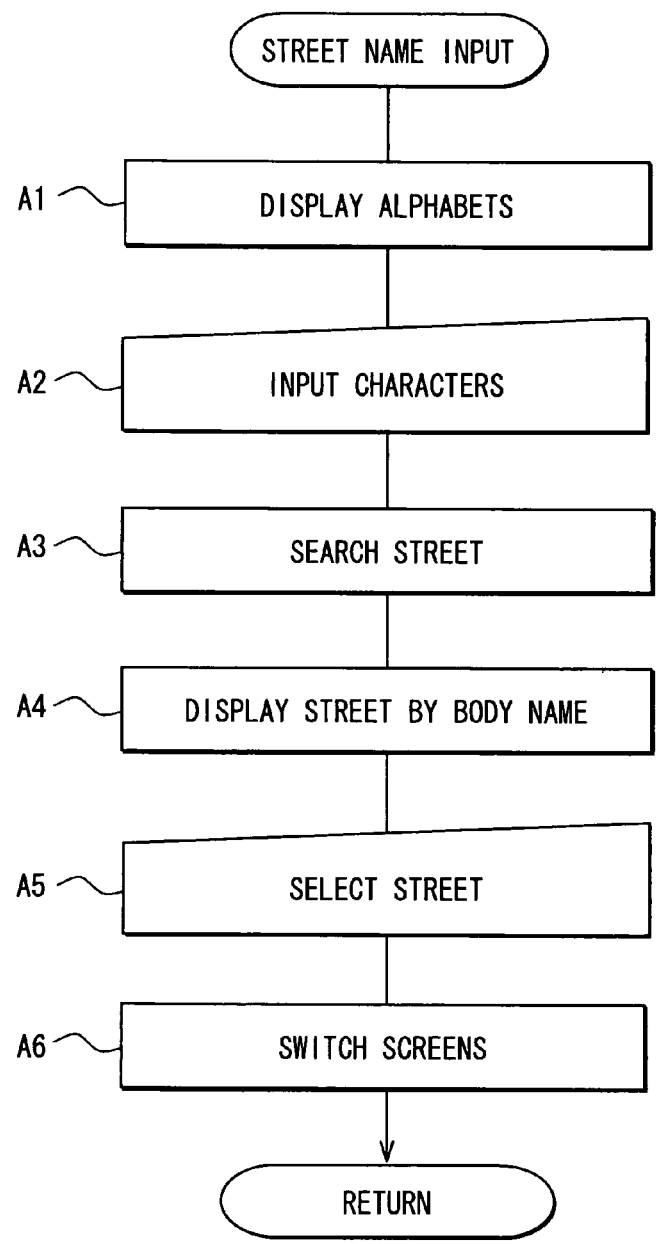
FIG. 4 shows a flowchart of a street name input.

The street name input concludes as it is described above, and the user presses a "List" key on the screen (step A2 in FIG. 4). Then, the control circuit 2 searches for a street including the character string of "CAR" among the formal names in the street search data of the map data (step A3). In the street search, the control unit 2 determines whether the inputted character string is included in various character strings that constitute the formal street names (the prefix character string, the body name character string, the suffix character string, and the street type character string divided by the space). That is, in the data of FIG. 2, the control circuit 2 will find the five streets because "E CAR St", "W CAR St", "W CARSON St", "E CARSON St", and "E CARSON AV" include "CAR" as a part of their strings.

Subsequently, referring to the display character data, the control circuit 2 searches for and displays the character strings (the body name character strings) of the five streets on the display unit 7 (step A4). That is, the control circuit 2 displays two display character strings of "CAR" and "CARSON" on the display unit 7 in this case, because "E CAR St" and "W CAR St" include "CAR" as the display character string, and "W CARSON St", "E CARSON St", "E CARSON AV" include "CARSON" as the display character string as shown in FIG. 5F.

Then, the user chooses "CAR" in this case because the user desires to specify "CAR" as the street of the destination (step A5). Then, the control circuit switches the screen of the display unit 7 to a required input item display screen for the address search, and shows "CAR" as a specified string for the street name as shown in FIG. 6A. In this manner, as the user is notified that the street is determined by using "CAR", the user is encouraged to proceed to the next input for selecting either of the House# or the City (step A6).

Then, the control circuit 2 displays the numeric keys on the display unit 7 when the House# is chosen by an operation. The user now inputs "5" "1" "6" by sequentially pressing the numeric keys on the display unit 7. Then, the control unit 7 displays "516" in the place of the House# assuming that "516" has been chosen as the house number as shown in FIG. 6A. Then, the control circuit 2 displays the alphabet in the same manner as FIG. 5B on the display unit 7 when the City is chosen as the input item. Then, the "List" portion is pressed after the user input of "ABC" by a sequential operation of the alphabet keys, the user operates the "List" part with all of the three required items completed (step S2 of FIG. 3).

Upon having all of the above inputs, the control circuit 2 searches for the address that includes all of the selected street (in this case, "CAR"), an inputted street name character string (in this case, "CAR"), the city name and the house number (step S3), and displays the searched address as, for example, shown in FIG. 6B on the display unit 7 (step S4). The illustration in FIG. 6B shows a situation that "516 E CAR St ABC" and "516 W CAR St ABC" are searched as the address that includes all of "516" "CAR" and "ABC" because, in this case, the selected street and an input string only identify "CAR" among the street names.

In this case, if the selected street (i.e., the body name) is "CAR" and the inputted street name is a formal street name string "W CAR St," the street can be identified as "W CAR St" and the control circuit 2 displays the only one address of "516 W CAR St ABC" on the display unit 7 based on the city name, the house address and the inputted street name string "W CAR St."

When there are plural addresses displayed on the display unit 7, the user chooses the desired address. When only one address is displayed, the user chooses the displayed address. Then, the control circuit 2 displays a map to show the place of the chosen address on the display unit 7 as shown in FIG. 6C. When the user performs an operation to set the displayed place as a destination after confirming the displayed place to be identical to the desired destination (step S5), the control circuit 2 searches for the coordinates of the address concerned from the position search data, sets the displayed place as the destination and searches for the course to the destination for displaying the course on a map on the display unit 7 (step S6).

On the other hand, when the formal name "W CAR St" is input as an input of the character string of the street in step A2 of FIG. 4, the control circuit 2 chooses "W CAR St" in the list in step A3 of FIG. 4 and, in step A4, displays the display character string "CAR" in the selected string "W CAR St" on the display unit 7. Because the only one street is chosen, the display street name on the display unit 7 only includes one street "CAR." Then, selection of "CAR" by the user is, as shown in FIG. 6A, displayed on the screen when the user presses "List" (step S5).

Then, the control circuit 2 searches for an address including all of "516", "W CAR St", and "ABC" when "List" is pressed in a state (a state same as FIG. 6A) that the street name, the house number and the city name are input because the street name selected is "W CAR St." In this search, the control circuit 2 yields only one search result of "516 W CAR St ABC" (step S3), and, displays the string on the display unit 7 (step S4). Then, the control circuit 2 displays a map including the searched address on the display unit 7, and displays the position of the address on the map when the user selects the displayed address by an operation (step S5). Then, the control circuit 2 sets the address concerned as the destination, and searches for the guidance course to the destination for displaying it on the map on the display unit 7 (step S6) when guidance start operation is performed.

As described above, the destination search can be performed when the street name is input as the formal name, or when the street name is input as the body name in the present embodiment. Further, when the searched street names based on the inputted street name are displayed on the display unit 7, the list of the searched name is displayed by the body name instead of the formal name, thereby enabling the user to select the desired destination street even when the user does not know the formal street name. In this manner, the usability of the navigation apparatus 1 is advantageously improved.

Second Embodiment

FIG. 7 shows the second embodiment of the present disclosure. The present embodiment applied to the intersection search to search an intersection of two streets as a destination by having two street names. That is, in the map data, there are entries of intersection data which memorizes two street names in the formal name character string in association with an intersection. In addition, data for converting the position of the intersection to the coordinates on the map are provided, thereby enabling a user to identify the position of the intersection in the map upon identifying the intersection in the intersection data.

The control circuit 2 displays, as shown in FIG. 7A, a screen on the display unit 7 promoting an input of two street names when the user chooses an intersection search as a search method. When the user chooses the input of one street name, he/she inputs a character string of the street name by the formal name string, or by the body name string with the alphabet keys on the display unit 7 as shown in FIG. 5B.

The control circuit 2 searches and displays, as it does in the first embodiment, a street including the inputted character string on the display unit 7. In this case, the street name is displayed by the body street name. When plural streets are displayed on the display unit 7, the user chooses one of the plural streets. Then, the other street name is input in the same manner to be displayed on the display unit 7. In this case, when more than two streets are displayed, the user chooses one of those streets.

When two streets are chosen in the above described manner, the control circuit 2 identifies each of the two streets based on the street that is selected in the same manner as the first embodiment and the text string inputted as the street name, searches an intersection where the two identified streets crosses with each other, and displays the intersection on the display unit 7. An example of the intersection display is shown in FIG. 7B. In FIG. 7B, "SAGINAW" is chosen as one street, and "FRANKLIN" is chosen as the other street. In addition, in the search result, there are two searched intersections, that is, one intersection is displayed as a crossing position of two streets respectively represented by the formal name of "N SAGINAW RD" and "FRANKLIN St," and the other intersection is displayed as a crossing position of two streets respectively represented by the formal names of "S SAGINAW St" and "FRANKLIN RD." When the user by oneself chooses a desired intersection from among these intersections, the control circuit 2 displays the chosen intersection with the map on the display unit 7.

Although the present invention has been fully described in connection with the preferred embodiment thereof with reference to the accompanying drawings, it is to be noted that various changes and modifications will become apparent to those skilled in the art.

For example, in the first embodiment, the order of input may be differently arranged. That is, the street name may not necessarily be input first.

Further, when the street name is input first, the input of following items such as the city name and the house number may be restricted in terms of use of input characters as shown in FIG. 5B based on the city name that has the inputted street name and the house number in association with the inputted street name. That is, for example, only the characters (i.e., alphabets and numbers) that can be used, for input may be highlighted and other characters may be dimmed on the screen for respective input of the subsequent characters.

Furthermore, the address search in the first embodiment may have a state name as an additional input item.

Furthermore, the city name in the first embodiment may be substituted by an alternative input such as a zip code or the like.

In this case, the input of the city name, or the alternative input is not required. That is, the input of the city name or the alternative may be omitted. For example, when the inputted street name exists in only one city, the input of the city name is not required.

Furthermore, the city name may be added as an input item in the second embodiment for a case where the intersection of two streets exist in two or more different cities.

Furthermore, the street search data in FIG. 2 may include body street name character strings besides the formal street name character strings. In this case, the body street name is displayed on the display unit 7 by using the exact string of the body street name character strings.

The destination search of the present disclosure may apply to the search of a destination on the way to the last destination.

Such changes and modifications are to be understood as being within the scope of the present invention as defined by the appended claims.

What is claimed is:

1. A navigation apparatus for use in a vehicle for searching for a destination based at least on one of a street name and a building number, the navigation apparatus comprising:
   a map data storage configured to store map data including data for enabling a destination search;
   an input unit configured to provide an inputted text string, which is inputted by a user and is to be searched, the inputted text string being either an inputted body name or an inputted formal name;
   a display unit; and
   a control unit configured to perform a search of the destination based on the inputted text string from the input unit,
   wherein the control unit includes
      a search unit configured to search a list of formal street names of a plurality of streets recorded as destination search data of the map data for a street that includes the inputted text string from the input unit, which can be either the inputted formal name or the inputted body name, in a stored formal street name text string contained in the list of formal street names, the stored formal street name text string includes a body name for representing a proper noun of a street name and at least one of a prefix, a suffix, or a street type, wherein the search unit generates a list of body names corresponding to matched formal street names; and
      a display control unit that controls the display unit;
   wherein
   the search unit is configured to provide the list of body names to the display control unit, the display control unit is configured to control the display unit such that the display unit displays the list of body names to the user, wherein the user selects one of the body names as a selected body name via the input unit,
   the control unit is configured to perform a search for an address by using (1) the selected body name, (2) the inputted text string from the input unit, and (3) a building number inputted by the user, wherein
   the inputted text string from the input unit is used twice, once by the search unit to generate the list of body names, and again by the control unit to search for the address,
   all formal names that include the inputted text string are displayed as the address in an address list, when the inputted text string is the body name instead of the formal name,
   selected formal names that match the inputted text string are displayed as the address in an address list, when the inputted text string is the formal name instead of the body name.

2. A navigation apparatus for use in a vehicle for searching for a destination that is defined as a crossing of two streets based on two different streets, the navigation apparatus comprising:
   a map data storage configured to store map data including data for enabling a destination search;
   an input unit configured to provide an inputted text string, which is inputted by a user, the inputted text string being either a body name or a formal name;
   a display unit; and
   a control unit configured to perform a search of the destination based on the inputted text string from the input unit,
   wherein the control unit includes
      a search unit configured to search a list of formal street names of a plurality of streets recorded as destination search data of the map data for a street that includes the inputted text string from the input unit, which can be either a body name or a formal name, in a formal street name text string contained in the list of formal street names, the formal street name text string includes a body name text string for representing a proper noun of a street name and at least one of a prefix, a suffix or a street type, the search unit generates a list of body names corresponding to matched formal street names;
   a display control unit that controls the display unit to display a list of searched streets; and
   the search unit is configured to provide the list of body names to the display control unit, the display control unit is configured to control the display unit such that the display unit displays the list of body names to the user, wherein the user selects a selected body name from the list of body names via the input unit,
   the control unit is configured to perform a search for an intersection of a first street and a second street by using (1) the selected body name associated with the first street, (2) an inputted text string associated with the first street, (3) a selected body name associated with the second street, and (4) an inputted text string associated with the second street, such that the inputted text string associated with the first street and inputted text string associated with the second street are each used twice, once by the search unit to generate the list of body names for each of the first street and the second street, and again by the control unit to search for the intersection, and
   the control unit displays the intersection of the first street and the second street.

3. The navigation apparatus of claim 1, wherein the display control unit displays a single matched street in the list of body names of the matched formal street names, when the search unit generates the single matched street in the list of matched streets.

4. The navigation apparatus of claim 2, wherein the display control unit displays a single matched street in the list of body names of matched formal street names, when the search unit generates the single matched street in the list of matched streets.

5. The navigation apparatus of claim 1, wherein the prefix before the body name represents a direction, the suffix after the body name represents a direction, and the street type represents the type of the street.

6. The navigation apparatus of claim 2, wherein the prefix before the body name represents a direction, the suffix after the body name represents a direction, and the street type represents the type of the street.

7. The navigation apparatus of claim 1, wherein:
   the input unit inputs an address that includes the street name, the building number and a city name;
   the search unit searches the address from among a plurality of streets recorded as destination search data of the map data, and creates a matched address list;
   the display control unit displays on the display unit the matched address list of the searched streets from the search unit.

8. The navigation apparatus of claim 7, wherein the user selects a desired address from the matched address list and the display control unit displays on the display unit a map of the desired address.

9. The navigation apparatus of claim 2, wherein the search unit creates a list of matching intersections that include a first street and a second street, the display control unit displays the intersection list to the user for the user to select a desired intersection.

10. The navigation apparatus of claim 9, wherein the display control unit displays a map of an intersection based on the desired intersection selected by the user.

11. The navigation apparatus of claim 1, wherein redundant body names among the list of body names corresponding to the matched formal street names are canceled from being displayed.

12. The navigation apparatus of claim 2, wherein redundant body names among the list of body names corresponding to the matched formal street names are canceled from being displayed.

13. The navigation apparatus of claim 1, wherein the formal name includes at least a prefix and a body name.

14. The navigation apparatus of claim 1, wherein the map data storage stores the stored formal street name text string of the plurality of streets of the map data with a stored body name text string of the plurality of streets.

15. The navigation apparatus of claim 1, wherein the selected body name is smaller than the inputted text string.

16. The navigation apparatus of claim 2, wherein the selected body name is smaller than the inputted text string.

17. The navigation apparatus of claim 1, wherein the inputted text string is the formal street name.

18. The navigation apparatus of claim 17, wherein the formal street name includes a prefix.

19. The navigation apparatus of claim 2, wherein the inputted text string is the formal street name.

20. The navigation apparatus of claim 19, wherein the formal street name includes a prefix.

21. The navigation apparatus of claim 1, wherein the display control unit controls the display unit to only display the list of body names when the list of body names is received from the search unit.

22. The navigation apparatus of claim 2, wherein the display control unit controls the display unit to only display the list of body names when the list of body names is received from the search unit.

* * * * *